United States Patent [19]
Yang

[11] Patent Number: 5,332,328
[45] Date of Patent: Jul. 26, 1994

[54] UNIVERSAL WINDSHIELD WIPER ARM CONNECTOR FOR MULTIPLE WIPER ARMS

[76] Inventor: Ming-Tung Yang, No. 4-3, Lane 97, Lung Chuan St., Panchiao, Taipei Hsien, Taiwan

[21] Appl. No.: 111,931

[22] Filed: Aug. 26, 1993

[51] Int. Cl.[5] .......................... B60S 1/40; F16C 11/04
[52] U.S. Cl. .................................. 403/154; 15/250.32; 403/161
[58] Field of Search ............ 15/250.32, 250.31, 250.35, 15/250.42, 250.36; 403/326, 327, 329, 263, 154, 155, 161

[56] References Cited

U.S. PATENT DOCUMENTS

| | | | |
|---|---|---|---|
| 4,370,775 | 2/1983 | van den Berg et al. | 15/250.32 |
| 4,443,907 | 4/1984 | Chamberlain | 15/250.32 |
| 5,065,474 | 11/1991 | Charng | 15/250.31 |
| 5,084,933 | 2/1992 | Buechele | 15/250.32 |

FOREIGN PATENT DOCUMENTS

| | | | |
|---|---|---|---|
| 2055560 | 3/1981 | United Kingdom | 15/250.32 |
| 2119637 | 11/1983 | United Kingdom | 15/250.32 |
| 2163042 | 2/1986 | United Kingdom | 15/250.32 |
| 2168243 | 6/1986 | United Kingdom | 15/250.32 |

OTHER PUBLICATIONS

Roberk Publication [Package Assembly Instructions] Printed 1988.

*Primary Examiner*—Timothy F. Simone
*Assistant Examiner*—Gary K. Graham
*Attorney, Agent, or Firm*—Bacon & Thomas

[57] ABSTRACT

The invention herein relates to a kind of total function windshield wiper arm connector structure, specifically referring to a kind of windshield wiper arm connector that can be utilized with many types of windshield wiper arm connection structures, while effectively and practically raising the positive value of windshield wiper arm connectors, lowering the cost when compared to the many types conventionally used windshield wiper connectors and offering a unique design that is useful.

1 Claim, 8 Drawing Sheets

UNIVERSAL WINDSHIELD WIPER ARM CONNECTOR FOR MULTIPLE WIPER ARMS

BACKGROUND OF THE INVENTION

Whereas there are may types and models of automobiles, therefore there are many differences among the extremely numerous types of windshield wiper arms. At minimum, there are six types: wide-hooked windshield wiper arms, narrow-hooked windshield wiper arms, flat strip-type windshield wiper arms, flat strip-type windshield wiper arms with threaded holes, insertion-pin type windshield wiper arms and lateral insertion-pin type windshield wiper arms. As indicated in FIG. 1 to FIG. 6, the design utilized for most windshield wiper arms only require consideration of a suitable installation length and angle and, furthermore, having a matching windshield wiper arm connector that is utilized for the installation of the windshield wiper arm. Thus, most windshield wipers sold include in their packaging cartons five to six pairs of different type arm connectors to enable, after the consumer has decided on the length to purchase, the installation and placement of the windshield wiper onto the arm utilizing one of the included connector pairs in a procedure that is simple and effective. However, the only problem is that although the practice of packaging five to six different type pairs of arm connectors in each carton of two windshield wipers attains the objective of installation and placement, only one out of five to six pairs of connectors are utilized, a wasteful situation that certainly does not comply with principle of economic efficiency and, furthermore, perhaps creates packaging volume and weight difficulties that may even effect the market competitiveness of the product, thereby precluding the attainment of high value profit margins.

SUMMARY OF THE INVENTION

The total function windshield wiper arm connector structure of the invention herein is a kind of structure that can be utilized on the connector structure of all current windshield wipers, wherein the construction of the invention herein includes a strip slot, two integrated side plates, each with semi-circular slots that provide two types of wide-hook and narrow-hook attachments integrated onto the windshield wiper arm and on the two side plates are a small diameter hole (A) and large diameter hole (B) that provides two types of insertion-pin shapes and lateral insertion-pin shapes integrated onto the windshield wiper arms, all of which offers a many types of practical functions that eliminates the shortcoming of the single function conventional windshield wiper arm connectors to constitute a new type of windshield wiper connector of practical and economical value, which is among the unique characteristics of the invention herein.

DETAILED DESCRIPTION OF THE PREFERRED EMBODIMENT

Figure 2:
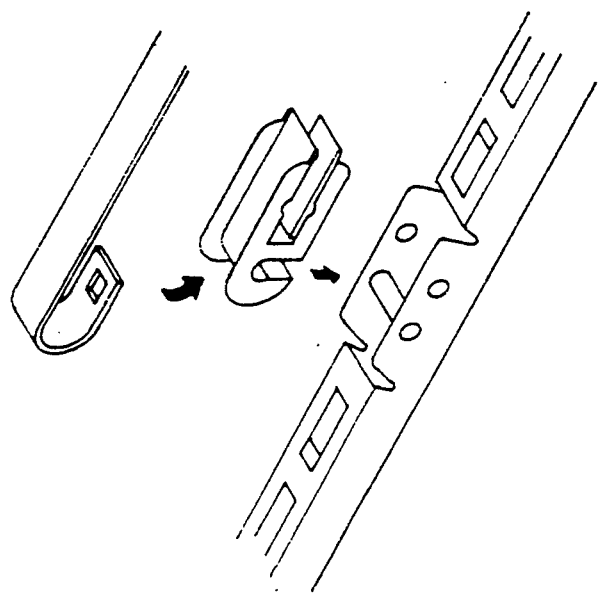
FIG. 2 is an isometric drawing of a narrow-hook windshield wiper arm juxtaposed with a conventional suspended-type windshield wiper arm connector.
Figure 1:
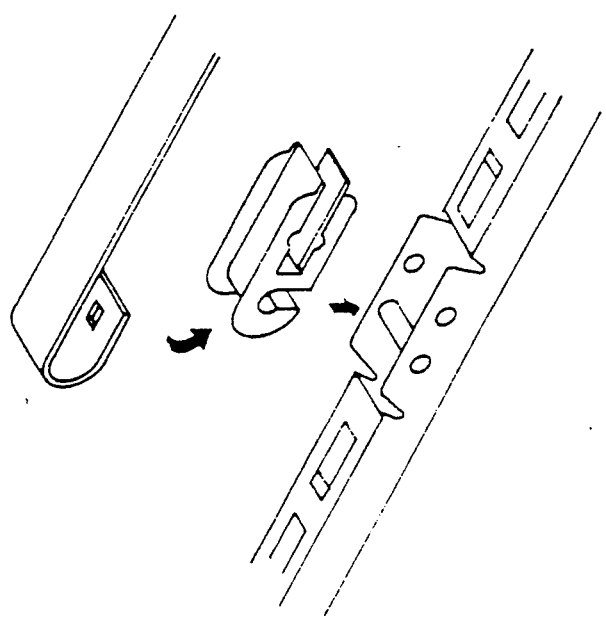
FIG. 1 is an isometric drawing of a wide-hook windshield wiper arm juxtaposed with a conventional suspended-type windshield wiper arm connector.
Figure 4:
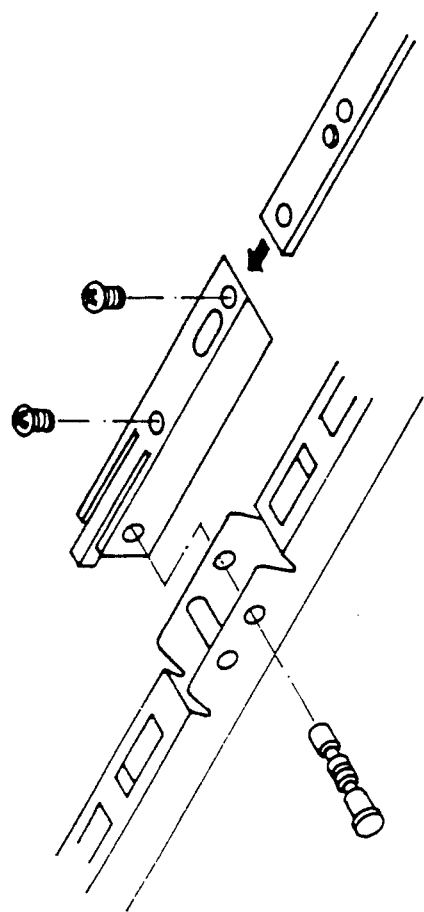
FIG. 4 is an isometric drawing of a flat strip-type windshield wiper arm with threaded holes and a conventional suspended-type windshield wiper arm connector.
Figure 3:
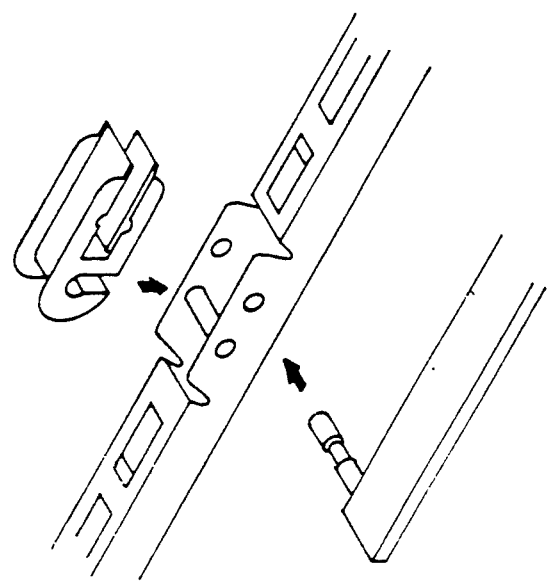
FIG. 3 is an isometric drawing of a flat strip-type windshield wiper arm and a conventional suspended-type windshield wiper arm connector.
Figure 6:
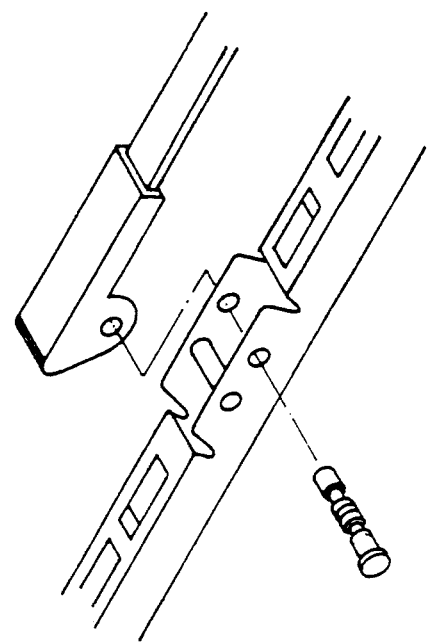
FIG. 6 is an isometric drawing of a lateral insertion-pin type windshield wiper arm and a conventional suspended-type windshield wiper arm connector.
Figure 5:
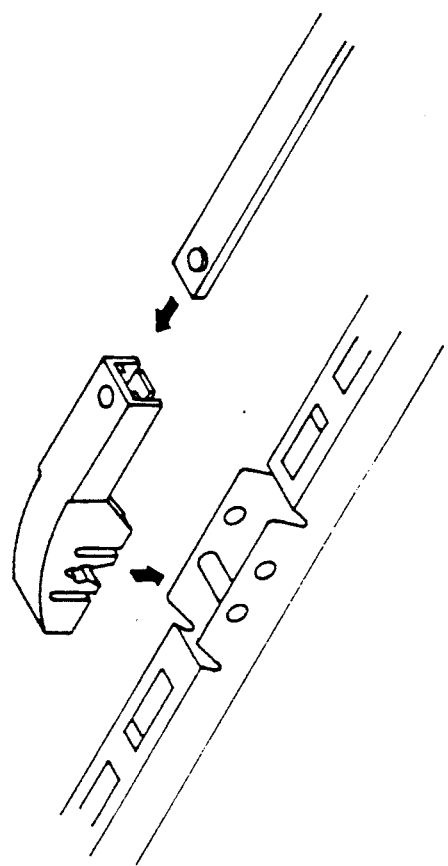
FIG. 5 is an isometric drawing of an insertion-pin type windshield wiper arm and a conventional suspended-type windshield wiper arm connector.
Figure 7:
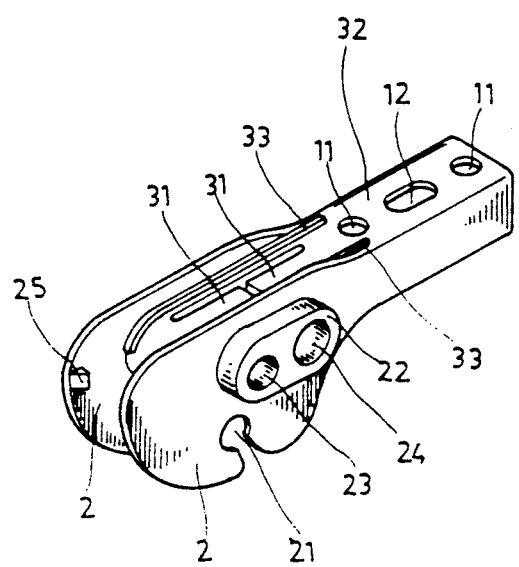
FIG. 7 is an isometric drawing of the windshield wiper connector of the invention herein.
Figure 10:
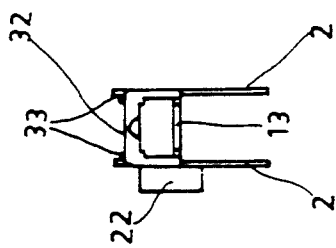
FIG. 10 is an orthographic drawing of the windshield wiper connector of the invention herein as viewed from the left side.
Figure 8:
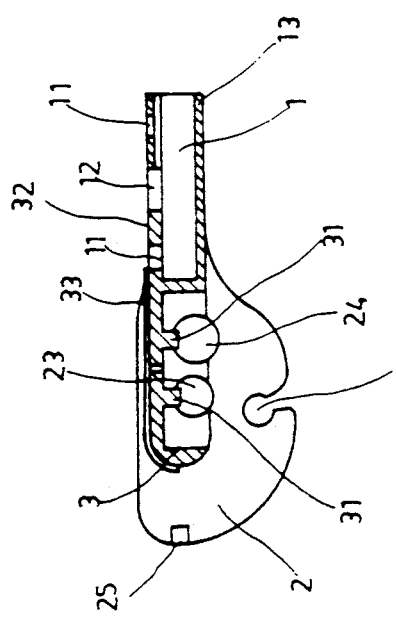
FIG. 8 is a cross-sectional drawing of the windshield wiper connector of the invention herein.
Figure 9:
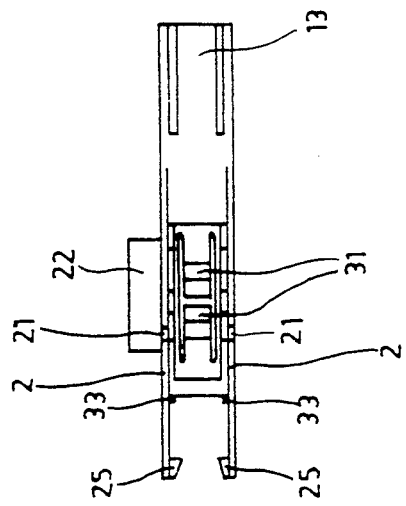
FIG. 9 is an orthographic drawing of the windshield wiper connector of the invention herein as viewed from the underside.
Figure 12:
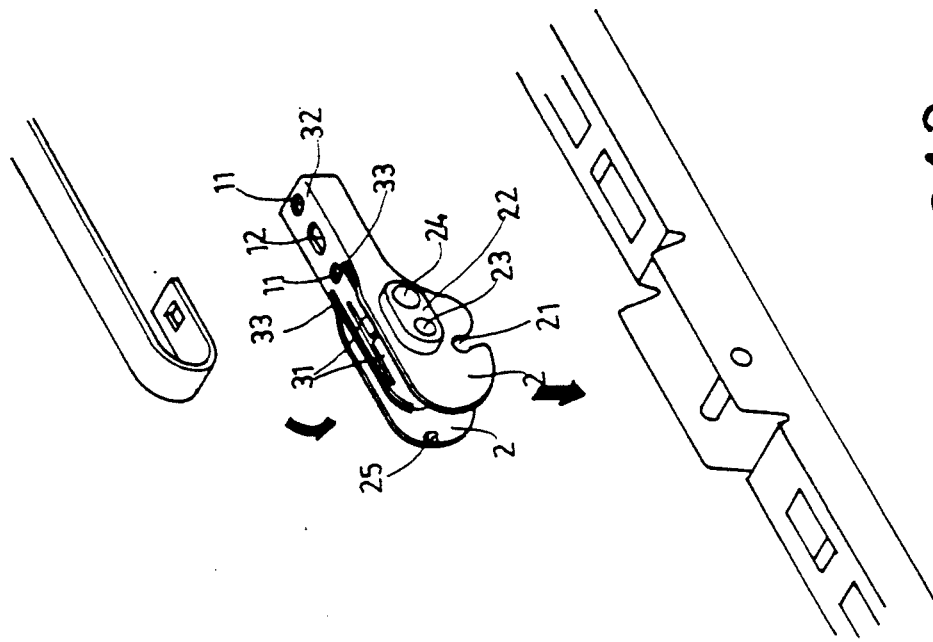
FIG. 12 is an isometric drawing of the windshield wiper connector of the invention herein as configured for attachment to the narrow-hook windshield wiper arm.
Figure 11:
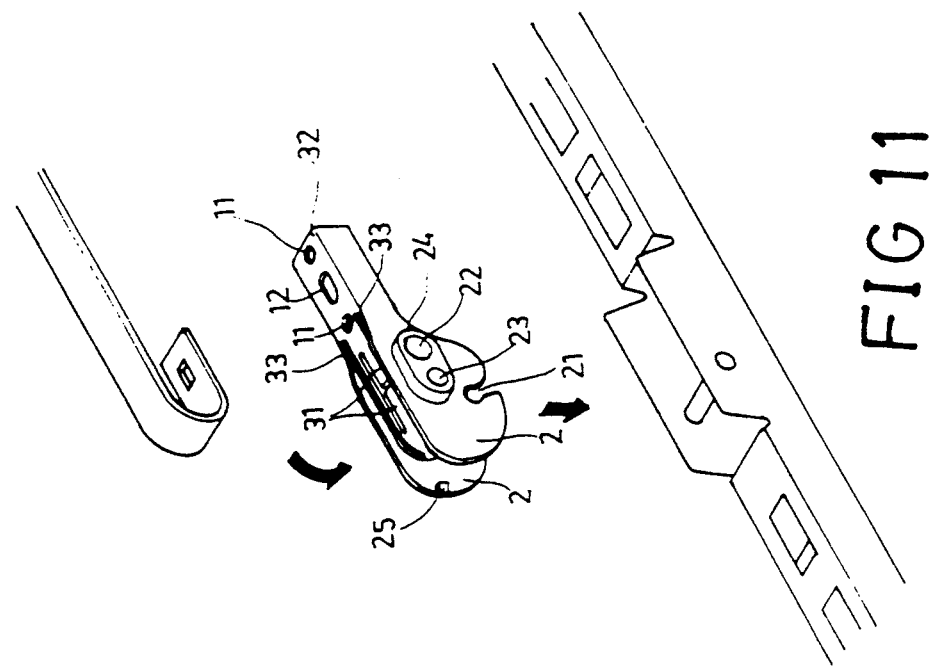
FIG. 11 is an isometric drawing of the windshield wiper connector of the invention herein as configured for attachment to the wide-hook windshield wiper arm.
Figure 14:
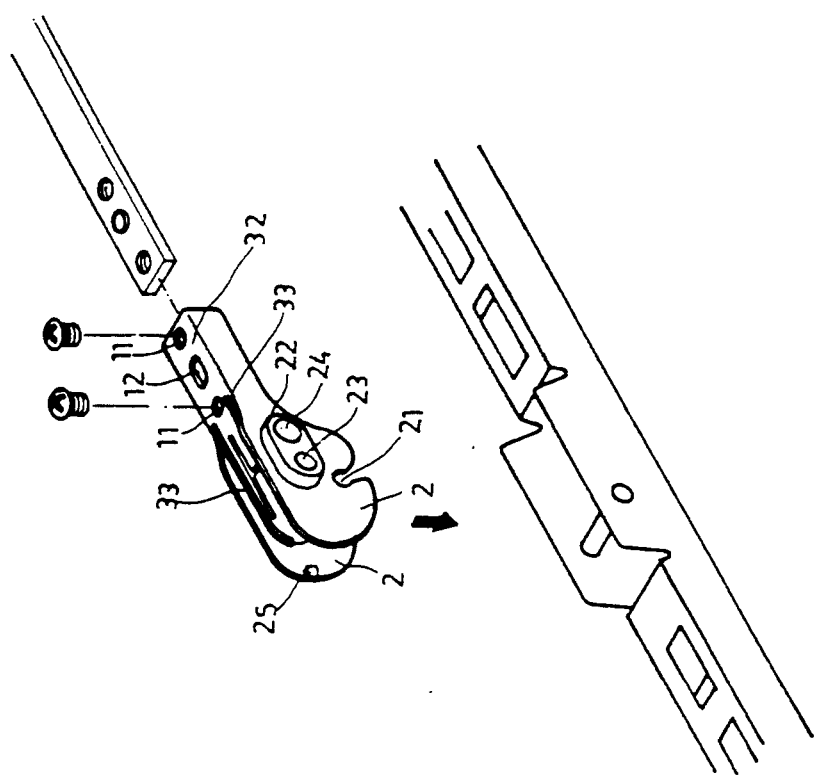
FIG. 14 is an isometric drawing of the windshield wiper connector of the invention herein as configured for attachment to a flat strip-type windshield wiper arm with threaded holes.
Figure 13:
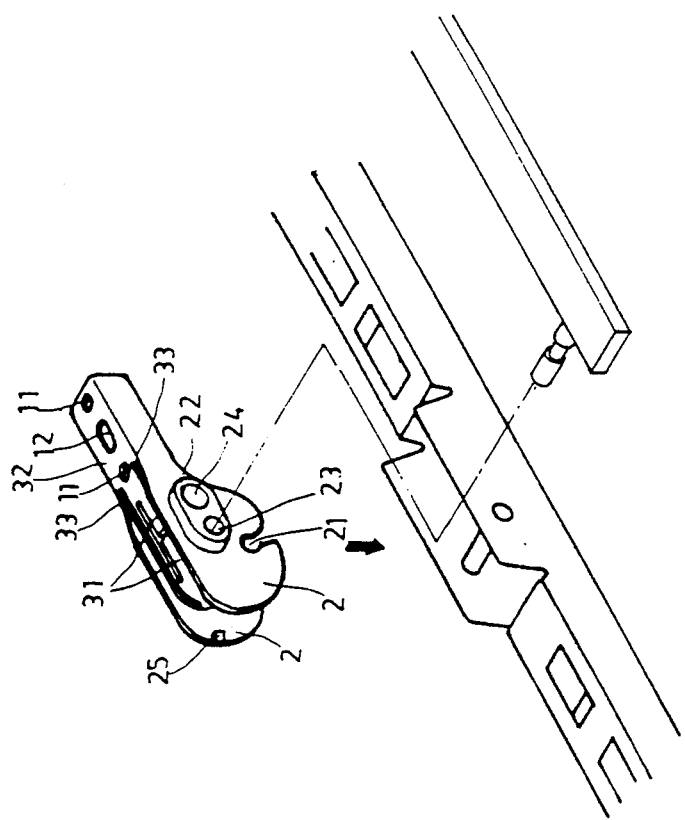
FIG. 13 is an isometric drawing of the windshield wiper connector of the invention herein as configured for attachment to a flat strip-type windshield wiper arm.
Figure 16:
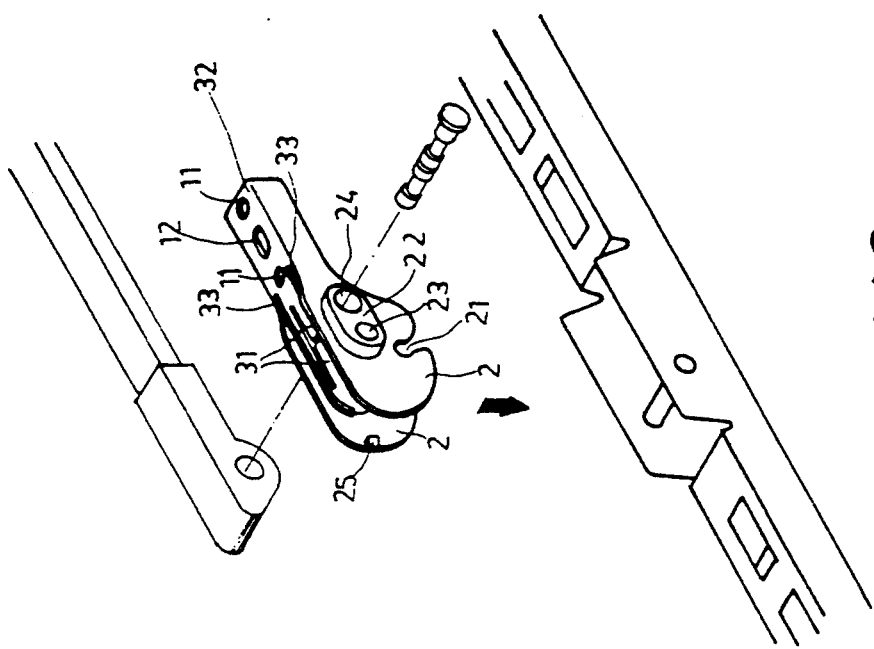
FIG. 16 is an isometric drawing of the windshield wiper connector of the invention herein as configured for attachment to a lateral insertion-pin type windshield wiper arm.
Figure 15:
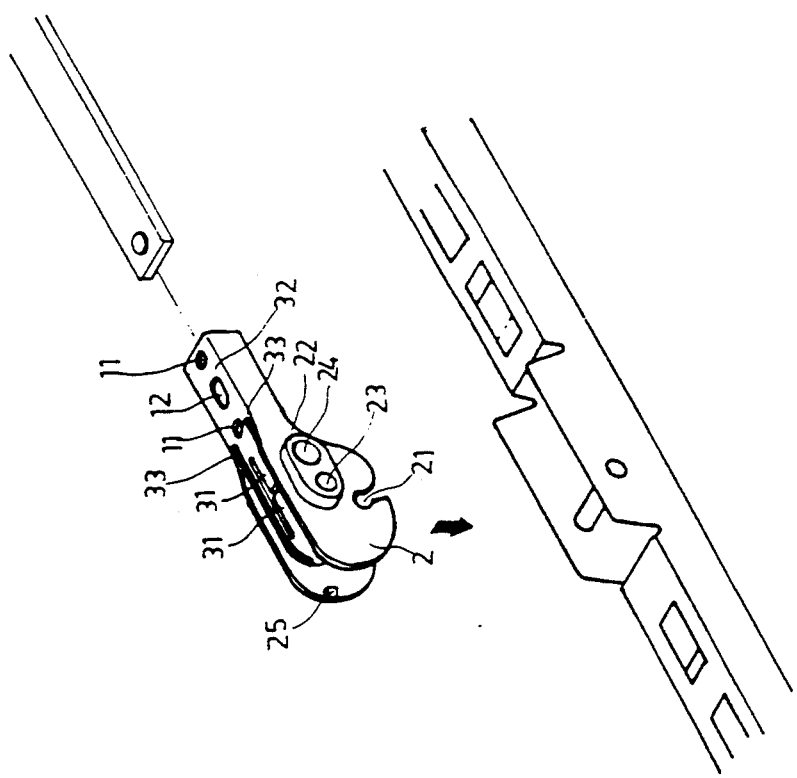
FIG. 15 is an isometric drawing of the windshield wiper connector of the invention herein as configured for attachment to an insertion-pin type windshield wiper arm.

As indicated in FIG. 7 to FIG. 10, the invention herein consists of a total function windshield wiper arm connector structure that can be utilized for installment on the connector structure of all windshield wipers currently in use, of the structure of the invention herein includes a strip slot (1), two side plates (2) and a semi-circular slot (3) injection molded as a single component, wherein the strip slot (1) is placed onto the tip of a windshield wiper arm relative to the extension of the two side plates (2) and, furthermore, there is a semi-circular slot (3) between the two side plates (2); of which, the strip slot (1) consists of an elongated and strip-shaped slot of such dimension that the insertion of a windshield wiper can be accommodated, and along the top are two threaded holes (11) and a long slotted hole (12), positioned along the underside is a flexible leaf spring portion (13); the two side plates (2) constitute a matched slide-in receptacle utilized as the connection slot that provides the insertion-pin and connection structure; and also positioned along the underside is a neck slot (21) consisting of an entry opening penetrating inwards that provides for the connection through the enslotment of the two side plates (2) onto a windshield wiper arm, and positioned along a lateral extent is a protruding tab (22) and positioned on the protruding tab (22) are indented insertion points in the form of a small diameter A-hole (23) and a large diameter B-hole (24) that provide for the insertion of a small and large insertion pins, furthermore, positioned along the front end of the inner walls of the two side plates (2) is a retaining tab (25) that prevents the windshield wiper arm from sliding out; the semi-circular slot (3) is a hook-shaped unit that is connected to the windshield wiper arm and positioned bidirectionally along the top are two separate protruding-tip leaf springs (31), of which the insertion tips are individually inserted into the small diameter A-hole (23) and a large diameter B-hole (24) to keep the two aforesaid holes fastened onto the inserted protruding-tip leaf springs (31) and, furthermore, there is windshield wiper arm channel (32) positioned above and between the two sides of the protruding-tip leaf springs (31) and each windshield wiper arm channel (32) has a step strip (33) that is utilized to enable the windshield wiper arm channel (32) to conform to different end widths that accommodates the tight connection to hook arms of varying width; the overall structural installation consists of connecting the neck slots (21) consisting of an entry opening penetrating inwards on the two side plates (2) to the slots of the windshield wiper arm and can be connected to all types of windshield wiper arm fastening assemblies; when the connector invention herein is utilized for fastening to wide-hook windshield wiper arms as indicated in FIG. 11, the windshield wiper arm can be fastened to the semi-circular slot (3) in between the two side plates (2) and also secured in position by the retaining tab (25); when the connector of the invention herein is utilized for fastening to narrow-hook windshield wiper arms as indicated in FIG. 12, the windshield wiper arm can be fastened to the semi-circular slot (3) in between the two side plates (2) and the two step strips (33), and also secured in position by the retaining tab (25); when the connector of the invention herein is utilized for fastening to flat-strip type windshield wiper arms as indicated in FIG. 15, the front end of the windshield wiper arm is directly inserted into the strip slot (1) at the rear end of the connector of the invention herein and at the same time the end of the protruding column inserted into the threaded hole (11) at the front of the connector of the invention herein, furthermore, the leaf spring (13) below securely holds the connected lower end of the windshield wiper arm; when the connector of the invention herein is utilized for fastening to flat-strip type windshield wiper arms with threaded holes as indicated in FIG. 14, after the front end of the windshield wiper is directly inserted into the strip slot (1) at the rear end of the connector or the invention herein, the protruding knob on the windshield wiper arm is inserted into the long slot hole (12) but retains the characteristic of forward and rearward movement so the two threaded holes (11) above the strip slot (1) can be aligned with the two screw holes of the windshield wiper arm; when the invention herein is utilized for fastening to insertion-pin type windshield wiper arms as indicated in FIG. 13, the windshield wiper arm is fitted onto the protruding tabs (22) on the lateral extent of the two side plates (2) and, furthermore, the small diameter A-hole (23) or the large diameter B-hole can be selected to accommodate the width of the inserted windshield wiper arm and, at the same time, the inserted windshield wiper is secured into position by the extending tip of the protruding-tip leaf spring (31);

when the connector of the invention herein is utilized for the fastening of lateral insertion-pin type windshield wiper arms as indicated in FIG. 16, the lateral pin of the windshield wiper arm can be fitted into the small diameter A-hole (23) or the large diameter B-hole, whichever is most suitable, and directly inserted through the connector of the invention herein, enabling the lateral extent of the windshield wiper arm to be fastened to the lateral extent of the connector and, at the same time, the penetrating lateral pin is kept secured in position by the extending tips of the protruding-tip leaf spring (31); in view of the aforementioned types of windshield wiper arms, it can be known that the connector product of the invention herein can definitely be fastened to the entire range of currently available windshield wiper arms and similarly offer an easier means of installation contrary to that offered by convention windshield wiper arms, moreover, the unique multi-application function of the invention herein will enable the packaging cartons of currently sold windshield wipers to contain only the single connector set product of the invention herein because the connector of the invention herein can be utilized with all windshield wiper arms and will not require the wasteful inclusion of five or six sets of connectors, thereby certainly constitutes a new type of windshield wiper arm connector that is practical and of beneficial economic value due to a profoundly innovative idea that furthermore consists of a structural product design that complies with the principles of economic usefulness.

Therefore, the major objectives of the invention herein can be known, specifically referring to the providing of a kind of total function windshield wiper arm connector structure of which the simple and precision structural installation method makes possible a connector set that can be effectively utilized with many different types of windshield wiper arms, enabling windshield wiper products to include only one connector set and thereby definitely lowering the burden of installation costs, while achieving beneficial value based on a new type of practicality.

The secondary objectives of the invention herein then consists of utilizing the specially designed strip slot, two side plates and semi-circular slot structural configuration of the invention herein to enable connection to wide-hook windshield wiper arms, narrow-hook windshield wiper arms, flat strip-type windshield wiper arms, flat strip-type windshield wiper blades with threaded holes, insertion pin-type windshield wiper arms and lateral insertion-pin type windshield wiper arms, in other words, the connector of the invention herein can be utilized with any type of windshield wiper blade whatsoever, to support the simple connection to windshield wiper arms and thus fulfill a convenient and practical function that complies with the psychological needs of mass consumer usage.

What is claimed is:

1. A universal windshield wiper arm connector for connecting a windshield wiper to a plurality of different types of windshield wiper arms, the connector comprising:

a) an elongated body having a top, a bottom, opposite sides, a first end portion and a second end portion, the first end portion defining a strip slot extending into the body to receive an end of a bayonet type wiper arm, the top of the body defining two threaded openings and an elongated slot communicating with the strip slot, the bottom of the body forming a first resilient leaf spring defining a portion of the strip slot;

b) a path of side plates extending parallel to each other and extending from the opposite sides of the body proximate to the second end portion, the side plates extending above the top of the body and beyond the second end portion of the body so as to define therebetween a space having a first width adapted to receive and end of a hook-type wiper arm having a first width, each side plate having a retaining tab extending therefrom, said tabs extending toward one another, each side plate having a lower edge portion which defines a single necked slot;

c) step strips located in the first width and extending along the top of the body adjacent to each side plate, the step strips defining therebetween a second width that is less than the first width and is adapted to receive therebetween an end of a hook type wiper arm having a second width;

d) a tab member protruding outwardly from one of the side plates, away from the body;

e) a first hole defined by the tab member and the side plates, said first hole having a first diameter;

f) a second hole defined by the tab member and the side plates, said second hole is adjacent to the first hole and has a second diameter larger than the first diameter;

g) a second resilient leaf spring defined by the top of the body having a portion extending into the first hole; and h) a third resilient leaf spring defined by the top of the body having a portion extending into the second hole.

* * * * *